United States Patent [19]

Sheu

[11] Patent Number: 4,929,113

[45] Date of Patent: May 29, 1990

[54] KNUCKLE JOINT

[76] Inventor: Yin-Ping Sheu, No. 3, Fl. 11-7, Fu Hsing Erh Rd., Ling Ya District, Kaohsiung City, Taiwan

[21] Appl. No.: 357,798

[22] Filed: May 30, 1989

[51] Int. Cl.⁵ .............................................. F16C 11/06
[52] U.S. Cl. ...................................... 403/157; 403/84; 403/91; 403/162; 403/164; 403/166; 403/324; 403/325
[58] Field of Search ...................... 403/83, 84, 91, 102, 403/119, 161, 162, 164, 166, 359, 324, 360, 325, 150, 157

[56] References Cited

U.S. PATENT DOCUMENTS

| | | | |
|---|---|---|---|
| 879,048 | 2/1908 | Hibbler | 403/84 X |
| 1,896,645 | 2/1933 | Pfauser | 403/324 X |
| 2,117,947 | 5/1938 | De Rome et al. | 403/325 X |
| 2,435,225 | 2/1948 | Kolodner et al. | 403/96 X |
| 4,105,347 | 8/1978 | Gossage | 403/324 X |
| 4,243,342 | 1/1981 | Marto | 403/324 |

Primary Examiner—Andrew V. Kundrat
Assistant Examiner—Franco S. DeLiguori
Attorney, Agent, or Firm—Ladas & Parry

[57] ABSTRACT

A knuckle joint in which a first piece with an eye enters a jaw between two corresponding projections of a second piece having a first and a second eye respectively formed therein, and is retained by a pin member, wherein the pin member comprises a pin having a first end with a button fixed thereat and a second end. The pin passes through the eye of the first piece, which then retractably protrudes the button out from the first eye of the second piece and extends the second end to a position near the second eye of the second piece. A stopper has a protrusion which is passed through the second eye of the second piece, extending into the eye of the first piece, and joined with the second end of the pin. A slide block is passed through by the pin and inserted within the eye of the first piece, retractably protruding into the first eye of the second piece. The knuckle joint can be pivotally rotated while the button is depressed to push the protrusion of the stopper out from the eye of the first piece and to push the slide block out from the first eye of the second piece.

4 Claims, 3 Drawing Sheets

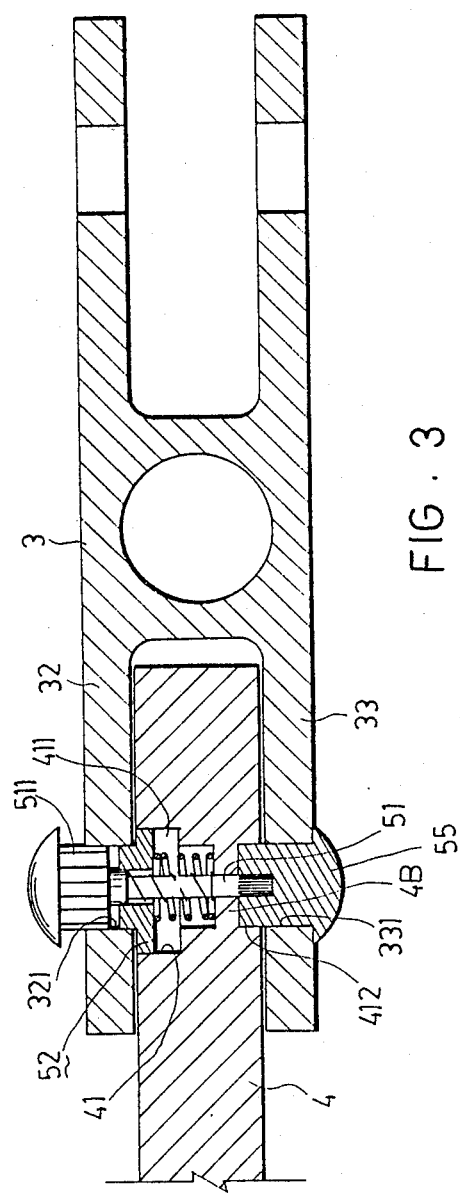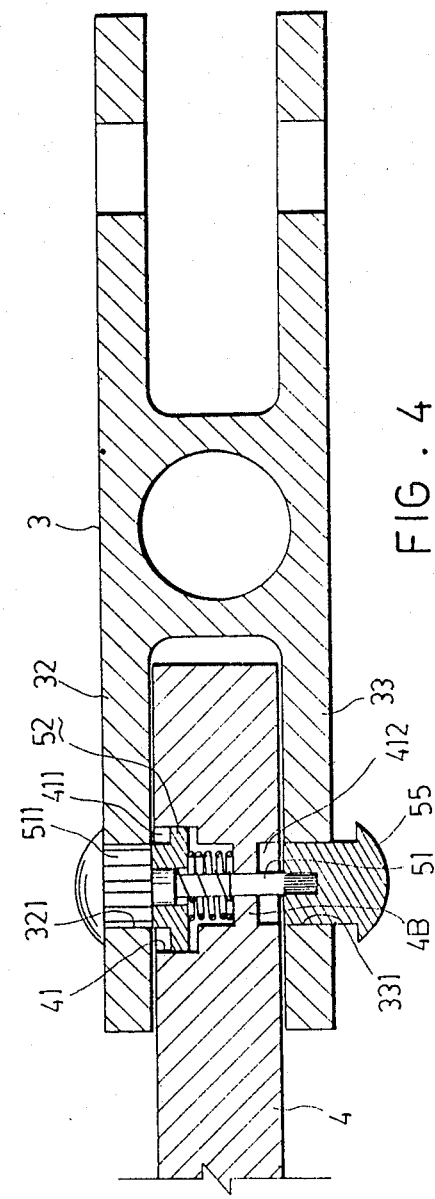

KNUCKLE JOINT

BACKGROUND OF THE INVENTION

This invention relates to a knuckle joint, more particularly to a knuckle joint having two pivotally connected pieces which can be securely engaged with each other.

Referring to FIG. 1, a sectional view of a conventional knuckle joint is shown. The knuckle joint includes a first piece 1 having a flange 11 which is pivoted to a second piece 12 by means of a rivet 110. The second piece 12 has a controlling button 121 for positioning the first piece 1 with respect to the second piece 12. The controlling button 121 has a restraining ring 123 which is retractably received in a arcuated groove 124 formed in the flange 11 of the first piece 1. When the controlling button 121 is depressed to enable the restraining ring 123 to protrude out from the groove 124 of the first piece 1, said first piece can be rotated relative to the second piece 12. However, such a knuckle joint suffers from the following disadvantages:

(1) A clearance is formed between the flange 11 of the first piece 1 and the second piece 12 for the purpose of relative rotation. This results in a loose engagement between the first and second pieces 1, 12 creating structural instability.

(2) The restraining ring 123, which is fitted within the groove 124 of the first piece 1 for checking the relative rotation between the first and second pieces 1, 12, slips within the groove 124 when an excessive torque is exerted on the first piece 1. That is to say, the restraining ring 123 cannot securely position the first piece 1 relative to the second piece 12.

SUMMARY OF THE INVENTION

It is therefore an object of this invention to provide a knuckle joint having two pieces which are pivotally connected thus creating good structural stability.

Another object of this invention is to provide a knuckle joint having two pieces which are pivotally connected and can be securely positioned with each other.

Accordingly, a knuckle joint of the present invention comprises a first piece with an eye which enters a jaw between two corresponding projections of a second piece having a first and a second eye respectively formed therein, and is retained by a pin member, the pin member comprising a pin having a first end with a button fixed thereat and a second end. The pin passes through the eye of the first piece, which retractably protrudes the button out from the first eye of the second piece and extends the second end to a position close to the second eye of the second piece. A stopper has a protrusion which is passed through the second eye of the second piece, extending into the eye of the first piece, and joined with the second end of the pin. The pin passes through a slide block and is inserted within the eye of the first piece, retractably protruding into the first eye of the second piece. Whereby, the knuckle joint can be pivotally rotated while the button is depressed to push the protrusion of the stopper out from the eye of the first piece and to push the slide block out from the first eye of the second piece. Moveover, the slide block and the first eye of the second piece, the slide block and the eye of the first piece, the protrusion of the stopper and the second eye of the second piece, and the protrusion of the stopper and the eye of the first piece, are all arranged in securely engaging relations so as to prevent the relative rotations therebetween. Therefore, the first and the second piece can be securely interlocked with each other even if an excessive torque is applied on said first piece.

BRIEF DESCRIPTION OF THE DRAWINGS

Other features and advantages of this invention will become apparent in the following detailed description of a preferred embodiment of this invention with reference to the accompanying drawings, in which:

FIG. 3 is a sectional schematic view showing the first and the second piece of the knuckle joint of this invention in an interlocked position.

FIG. 4 is a sectional schematic view showing the first and second piece of the knuckle joint of this invention in a rotatable position.

DETAILED DESCRIPTION OF A PREFERRED EMBODIMENT

Figure 1:
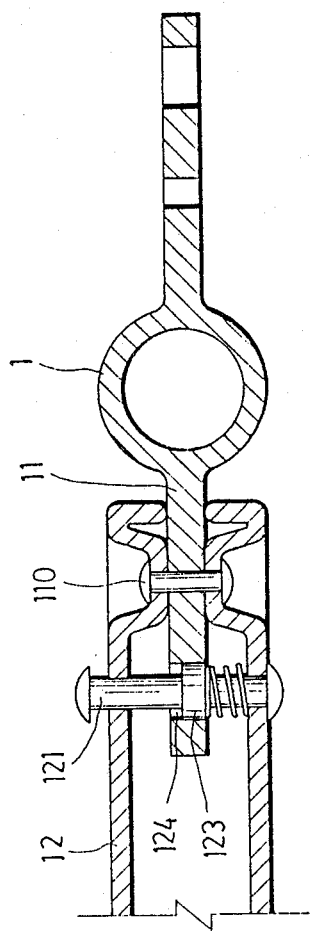
FIG. 1 is a sectional view of a conventional knuckle joint.
Figure 2:
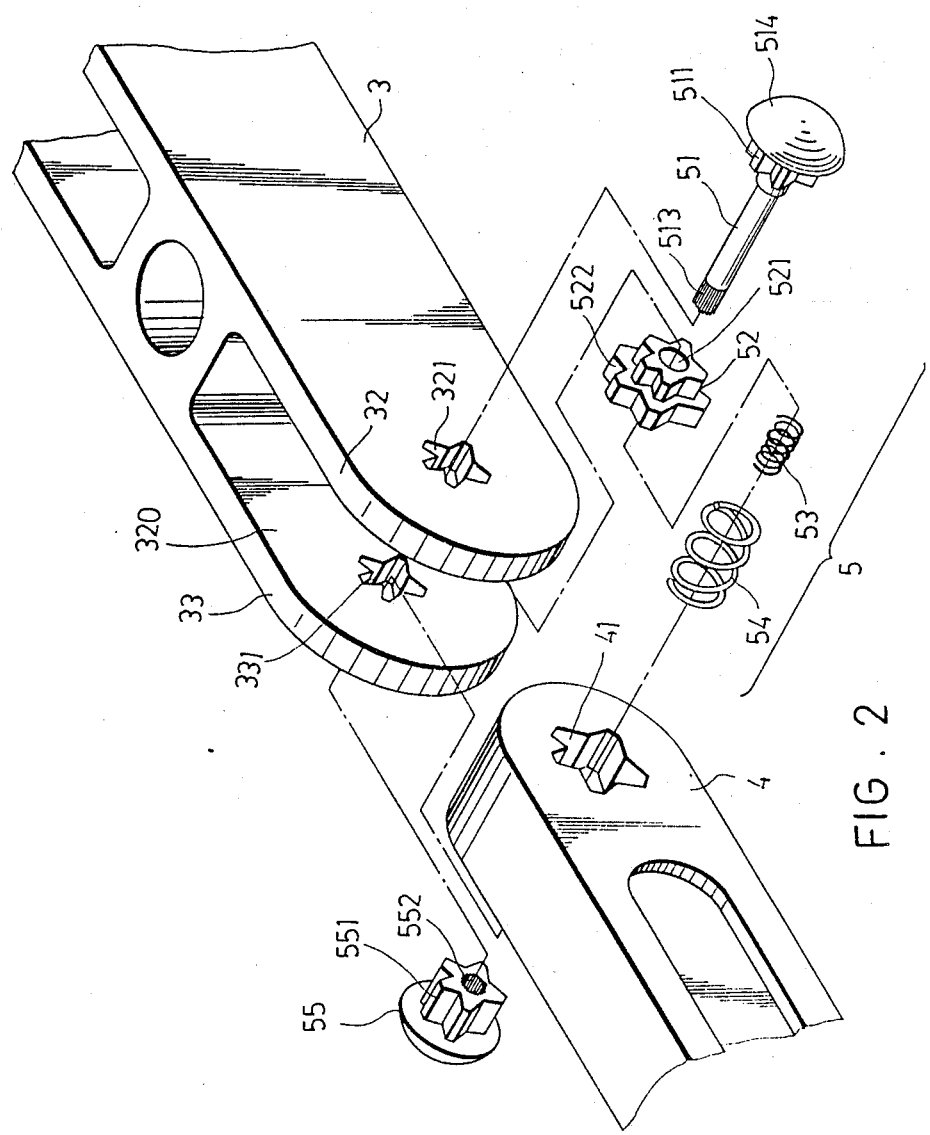
FIG. 2 is a perspective exploded view of a preferred embodiment of a knuckle joint of this invention.

Referring to FIG. 2, a perspective exploded view of a preferred embodiment of a knuckle joint of this invention is shown. The knuckle joint includes a first piece 4 with an eye 41 which enters a jaw 320 between two corresponding projections 32, 33 of a second piece 3 having a first and a second eye 321, 331 respectively formed therein, and is retained by a pin assembly 5. The pin member 5 comprises a pin 51 having a first end with a button 514 fixed thereat and a second end 513, a stopper 55 having a protrusion 551 in which a cavity 522 is formed, and a slide block 52. The eye 41 of the first piece 4, as well as the first and the second eyes 321, 331 of the second piece 3 are all star-shaped cross sections. The pin 51 passes through the first eye 321 and a through bore 521 of the slide block 52 and extends the second end 513 thereof into the second eye 331 of the second piece 3. The pin 51 has a projection 511 formed near the button 514 which is adapted to be slidably received in the first eye 321 of the second piece 3. The projection 511 and the first eye 321 of the second piece 3 are complemental to each other so as to prevent relative rotation therebetween. The slide block 52 is formed with a first and a second portion 521, 522 wherein the former is adapted to be extended into the first eye 321 of the second piece 3 and the latter is adapted to be slidably received in the eye 41 of the first piece 4. The first and the second portions 521, 522 have shapes respectively complemental to those of the first eye 321 of the second piece 3 and the eye 41 of the first piece 4 so as to prevent any relative rotation between the first and the second piece 4, 3, when the first portion 521 protrudes into the first eye 321 of the second piece 3. The protrusion 551 of the stopper 55 has a shape which complements those of the second eye 331 of the second piece 3 and the eye 41 of the first piece 4. The protrusion 551 of the stopper 55 is adapted to pass through the second eye 331 of the second piece 3 and protrude into the eye 41 of the first piece 4 with the second end 513 of the pin 51 fitted into the cavity 552 to join with the stopper 55. Therefore, the first piece 4 cannot be rotated relative to the second piece 3 when the protrusion 551 extends into the second eye 331 of the second piece 3.

Referring to FIG. 3, the eye 41 of the first piece 4 has a first section 411 for receiving the slide block 52, a second section 412 adapted to receive the protrusion 551 of the stopper 55, and a transition section formed with a wall 4B for connecting the first and the second sections 411, 412. A first and second coil spring 53, 54 are installed within the first section 411 and around the pin 51. The first coil spring 53 is disposed between the wall 513 and the projection 511, urging the projection 511 and the button 514 to partially protrude out from the first eye 321 of the second piece 3 so as to enable the protrusion 551 of the stopper 55 to extend into the second section 412. The second coil spring 54 is disposed between the wall 4B and the slide block, urging the first portion 521 of the slide block 52 to protrude into the first eye 321 of the second piece 3. In this position, the first and second pieces 4, 3 are securely interlocked to prevent the relative rotation therebetween. Moreover, the abovementioned parts of the knuckle joint are firmly engaged so as to achieve good structural stability.

Referring to FIG. 4, when the button 514 is depressed to push the protrusion 551 of the stopper 55 out from the eye 41 of the first piece 4 and to push the first portion 521 of the slide block 52 out from the first eye 321 of the second piece 3, the first piece 4 can be pivotally rotated with respect to the second piece 3. The first piece 4 will be positioned relative to the second piece 3 when the button 514 is released to protrude upward into a position, as best illustrated in FIG. 3. The first piece 4 and the second piece 3 are interlocked with each other with secure engagements existing between the abovementioned eyes and the corresponding protrusions so that even if an excessive torque is exerted either on the first piece 4 or the second piece 3, there would be no relative rotation between said first and second pieces 4, 3 due to spline surface engagement between said eyes and said corresponding protrusions.

With this invention thus explained, it is apparent that numerous modifications and variations can be made without departing from the scope and spirit of this invention. It is therefore intended that this invention be limited only as indicted in the appended claims.

I claim:

1. A knuckle joint in which a first piece with an eye enters a jaw between two corresponding projections of a second piece having a first and a second eye respectively formed therein, and is retained by a pin assembly, wherein said pin assembly comprises:

a pin having a first end with a button fixed thereat and a second end, said pin being passed through said eye of said first piece, said pin retractably protruding said button out from said first eye of said second piece and extending said second end to a position near said second eye of said second piece;

a stopper having a protrusion passed through said second eye of said second piece, extending into said eye of said first piece, and joined with said second end of said pin; and a slide block which is passed through by said pin and extended into said eye of said first piece, retractably protruding into said first eye of said second piece;

whereby said knuckle joint can be pivotally rotated while said button is depressed to push said protrusion of said stopper out from said eye of said first piece and to push said slide block out from said first eye of said second piece.

2. A knuckle joint as claimed in claim 1, wherein said eye of said first piece comprises:

a first section for receiving said slide block;

a second section adapted to receive said protrusion of said stopper; and a transition section formed with a wall for connecting said first and said second sections.

3. A knuckle joint as claimed in claim 2, further comprising a first and second coil spring installed within said first section and around said pin, said first coil spring being disposed between said wall of said transition section and said button of the first end of said pin, urging said button to partially protrude out from said first eye of said second piece so as to enable said protrusion of said stopper to insert into said second section, said second coil spring being disposed between said wall and said slide block, urging said slide block to protrude partially into said first eye of said second piece.

4. A knuckle joint as claimed in claim 1, wherein the structural interfit between said slide block and said first eye of said second piece, between said slide block and said eye of said first piece, between said protrusion of said stopper and said second eye of said second piece, and between said protrusion of said stopper and said eye of said first piece, are all arranged in a manner which will prevent relative rotation therebetween.

* * * * *